(12) United States Patent
Bailey

(10) Patent No.: US 11,516,362 B1
(45) Date of Patent: Nov. 29, 2022

(54) METHODS AND SYSTEMS FOR USING HALFTONE SCREENING FOR SECURITY MARKINGS AND OTHER GRAPHICS

(71) Applicant: Global Graphics Software Limited, Cambridge (GB)

(72) Inventor: Martin Bailey, Cambridgeshire (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 0 days.

(21) Appl. No.: 17/670,923

(22) Filed: Feb. 14, 2022

(51) Int. Cl.
H04N 1/00 (2006.01)
H04N 1/32 (2006.01)
H04N 1/54 (2006.01)

(52) U.S. Cl.
CPC ..... *H04N 1/00883* (2013.01); *H04N 1/32256* (2013.01); *H04N 1/32309* (2013.01); *H04N 1/54* (2013.01); *H04N 2201/323* (2013.01); *H04N 2201/3233* (2013.01)

(58) Field of Classification Search
CPC ........... H04N 1/00883; H04N 1/32256; H04N 1/32309; H04N 1/54; H04N 2201/323; H04N 2201/3233
See application file for complete search history.

(56) References Cited

U.S. PATENT DOCUMENTS

| | | | |
|---|---|---|---|
| 6,993,149 B2 * | 1/2006 | Brunk | G06T 1/0028 382/162 |
| 7,239,426 B2 * | 7/2007 | Iwasaki | H04N 1/52 358/2.1 |
| 7,889,390 B2 * | 2/2011 | Wang | H04N 1/32203 358/1.9 |
| 8,179,570 B2 * | 5/2012 | Zhao | H04N 1/32256 358/518 |
| 8,310,717 B2 * | 11/2012 | Ochs | H04N 1/54 358/1.9 |
| 8,363,280 B2 * | 1/2013 | Dalal | H04N 1/4051 358/3.06 |
| 8,467,098 B2 * | 6/2013 | Rich | H04N 1/54 358/468 |
| 9,628,662 B1 * | 4/2017 | Emmett | H04N 1/60 |
| 2004/0032602 A1 * | 2/2004 | Teraue | H04N 1/6011 358/1.9 |
| 2005/0068585 A1 * | 3/2005 | Shimizu | H04N 1/6052 358/534 |

\* cited by examiner

*Primary Examiner* — Scott A Rogers
(74) *Attorney, Agent, or Firm* — Branch Partners PLLC; Bruce E. Black

(57) ABSTRACT

A method for preparing a select graphic for printing using a digital printing device includes receiving the select graphic, at least one position for printing the select graphic, and a select spot color name for the select graphic, wherein the select spot color name represents a tone printable using at least one colorant of the digital printing device; generating a select spot color separation for the select graphic using a halftone screen to produce the tone represented by the security spot name, wherein the halftone screen is selected for printing the select graphic without a discernible dot pattern upon unmagnified viewing; and preparing raster data incorporating the select spot color separation for printing the select graphic at the at least one position on the item.

20 Claims, 1 Drawing Sheet

METHODS AND SYSTEMS FOR USING HALFTONE SCREENING FOR SECURITY MARKINGS AND OTHER GRAPHICS

FIELD

The present invention is directed to the area of document processing and printing. The present invention is also directed to methods and systems for using halftone screening for security markings and other graphics for a digital printing device.

BACKGROUND

Many documents or other printed items utilize some form of security printing to identify them. Security printing can be used, for example, for anti-counterfeit measures, for tracking and tracing purposes, for checking the provenance of the document or other printed item, or any other suitable purpose.

Conventionally, security printing can include one or more overt (user-visible) and covert (intended not to be noticed) measures. Overt measures can include, for example, guilloché, microtext, holograms, watermarks, or the like included on the document or other printed item. Covert measures can include the use of taggants in the substrate (e.g., the print medium) or in the inks, the use of magnetic inks, or the like. There continues to be a need for additional security printing measures including measures that can be implemented on digital printing devices.

BRIEF SUMMARY

One embodiment is a method for preparing a select graphic for printing using a digital printing device. The method includes receiving the select graphic, at least one position for printing the select graphic, and a select spot color name for the select graphic, wherein the select spot color name represents a tone printable using at least one colorant of the digital printing device; generating a select spot color separation for the select graphic using a halftone screen to produce the tone represented by the security spot name; and preparing raster data incorporating the select spot color separation for printing the select graphic at the at least one position on the item.

Another embodiment is a system for processing a document for printing. The system includes at least one processor configured and arranged to perform actions, including receiving the select graphic, at least one position for printing the select graphic, and a select spot color name for the select graphic, wherein the select spot color name represents a tone printable using at least one colorant of the digital printing device; generating a select spot color separation for the select graphic using a halftone screen to produce the tone represented by the security spot name; and preparing raster data incorporating the select spot color separation for printing the select graphic at the at least one position on the item.

A further embodiment is a non-transitory computer-readable medium having processor-executable instructions for processing documents, the processor-executable instructions when installed onto a device enable the device to perform actions, including receiving the select graphic, at least one position for printing the select graphic, and a select spot color name for the select graphic, wherein the select spot color name represents a tone printable using at least one colorant of the digital printing device; generating a select spot color separation for the select graphic using a halftone screen to produce the tone represented by the security spot name; and preparing raster data incorporating the select spot color separation for printing the select graphic at the at least one position on the item.

In at least some embodiments, the select graphic is a security marking. In at least some embodiments, the select graphic is a guilloche pattern. In at least some embodiments, the select graphic is configured for tessellation over a region of a printed item.

In at least some embodiments, the tone represented by the select spot color name is generated by the halftone screen using 100% coverage of a single ink level. In at least some embodiments, the single ink used by the halftone screen is not a lowest ink level of the digital printing device or a highest ink level of the digital printing device. In at least some embodiments, the tone represented by the select spot color name is generated by the halftone screen using only a single ink level, wherein the single ink is not a lowest ink level of the digital printing device or a highest ink level of the digital printing device.

In at least some embodiments, the halftone screen is selected for printing the select graphic without a discernible dot pattern upon unmagnified viewing. In at least some embodiments, the method or actions further include printing the raster data. In at least some embodiments, preparing the raster data includes merging the select spot color separation with a color separation for a one of the at least one colorants used by the tone represented by the select spot color name.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for using halftone screening for security markings and other graphics for a digital printing device.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
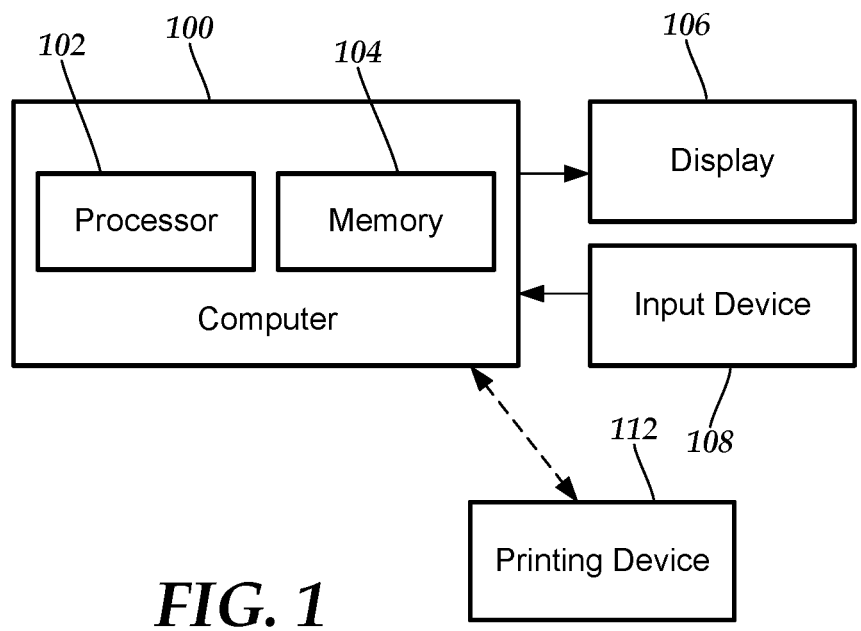
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be a digital printing device, such as an inkjet device or an electrophotographic (e.g., toner) device, or any other suitable printing device. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 102. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Typically, conventional printing devices, such as printing presses, using offset lithography and flexography can only print two levels of each ink—none or solid. Intermediate tones can be created using a process called halftone screening that includes printing a large number of halftone dots, which are small areas of ink, in such a way that the human eye sees a tint instead of the dots, at least from the intended reading distance. If viewed more closely, or through a magnifying device, the dots can often become evident.

Halftoning is a process by which continuous-tone imagery are approximated on an output device (e.g., printing device) through the use of drops or dots that may vary in size, spacing, or both. The tiny halftone dots are blended into smooth tones by the human eye. Halftoning can also be used to provide continuous-tone colors using only a limited number of discrete colors. Colors that the device cannot produce directly are simulated by using patterns of pixels in the colors available. One familiar example of halftone is the rendering of gray tones with black and white pixels, as in a newspaper photograph.

Halftoning is commonly practiced using a screening function to select the size or position of the halftone dots. Examples of screening functions are spot function-based screens, tile-based screens (such as threshold screens), or algorithmic screens (such as error diffusion screens.)

Many digital presses and printing devices, however, are capable of printing a small number of intermediate tone levels natively. Inkjet printing will be used herein as an example of digital press printing and for terminology. It will be understood that at least some toner (for example, dry or liquid electrophotographic) printing devices have the same capabilities as inkjet printing devices and that the methods and systems described herein can be applied to those printing devices.

The term "press" is commonly used to denote a large printing device that is used for production printing. It will be understood that the methods and systems described herein are equally applicable to any printing device including, but not limited to, presses and printing devices that are commonly designed for home or office use. Therefore, unless indicated otherwise, the terms "press" or "presses" can be substituted by the terms "printing device" or "printing devices". Unless indicated otherwise, the terms "colorant" and "ink" are interchangeable.

Many inkjet printing devices have the capability to eject different sizes of ink drops, for example, by varying the voltage and wave form of the electric current supplied to a piezoelectric inkjet head. Other inkjet presses and printing devices can eject streams of one or more drops in such a way that the drops will either coalesce in flight, before landing on the substrate, or will land on the substrate in very close proximity to each other. These drop delivery approaches can place different amounts of the ink a location on the substrate, leading to an appearance of different tone levels of that ink.

Typically, however, such printing devices are only capable of delivering a small number of different ink levels, ranging from two upwards. The maximum number of ink levels is typically five or fewer, although a few printing devices can range up to 15 or so. Thus, to achieve a number of tone levels for accurate color reproduction, other methods are typically used to print intermediate tone levels.

Among the most common methods is halftone screening, which is often similar to halftone screening used on offset or flexographic presses, albeit complicated, at least in some instances, by accounting for multiple different ink levels. Such halftone screening is sometimes referred to as "multilevel screening".

The placement of pixels on the output can be marked at each tone level and can be more dispersed than would be used on offset or flexographic presses because smaller clusters of marked pixels can often reproduce correctly on most digital printing devices than is typically possible on offset or flexographic presses. The dispersion can facilitate a smoother appearance of the tone and color. However, upon looking closely the screen pattern will often still be discernable.

In at least some embodiments, multi-level screening may be complicated by two factors. First, a multi-level screening algorithm determines which pixels within an area are marked with a selected ink level for each tone level. Typically, lighter tones can be achieved by marking some pixels with the lowest ink level and increasing the number of pixels marked in that way for progressively darker tone levels. At some point, the next larger ink level will be added into the mix to continue the progression. In designing this sequence, it is common practice to ensure that there is no tone level (with the possible exception of the lowest or highest tone levels) at which all of the pixels are filled with the same ink level. If there were, then a long smooth gradation (aka vignette) would likely have a band across it that had a distinctly smoother texture than areas on either side of it.

Second, the tonal response of a digital printing device that can image multiple different ink levels is very commonly non-linear. On many printing devices a 100% coverage of the lowest ink level would result in approximately ⅔ of the maximum density that the printing device could achieve, even if there are as many as five addressable ink levels. The tonal response will vary between printing devices and between printing substrates. In at least some cases, the tonal response may even vary from day to day, for example, due to temperature or humidity changes or other factors. Because of this, the exact point in the progression of screen levels that will be used for any specific tint value from an incoming job file (for example, a PDF file) may not be determinable in advance and may not be the same across multiple printing devices.

As described herein, in at least some embodiments, digital printing devices can generate and print one or more security markings or other specific graphics. In at least some embodiments, the printed security markings are primarily covert. In at least some embodiments, one or more graphics within a job can be halftoned using a specially selected multi-level screening design to generate identifiable results, which can be used, in at least some embodiments, as security marking(s).

Page Description Languages (PDLs) such as the Portable Document Format (PDF) or PostScript provide methods to assign halftone screens to individual graphics or graphic elements. The assignments typically work well on printing devices that only use one ink level but are often not applicable to a digital printing device for one or more reasons. For example, in many workflows for digital printing devices, any screens specified in the incoming job file are often ignored because the screens may not be appropriate for the printing device being used. For example, a print job prepared for an offset or flexographic press may use an AM (amplitude modulated) halftone screen with clustered dots, while an inkjet printing device will often achieve much better results with a dispersed (FM—frequency modulated) halftone screen. Moreover, many digital printing devices are supplied with halftone designs or screens that have been defined to increase print quality on that press, substrate, or combination of printing device and substrate.

In addition, the mechanisms defined to request specific halftone screens in PostScript and PDF are useful for single-bit halftone screens for offset and flexographic presses, but less useful for digital printing devices. There can be guidance as to how to select screens in a multi-level system, however, in at least some instances, the descriptions are not sufficiently complete to support interoperability between software products from different vendors. Furthermore, the limited description of the halftone screens may imply an expectation of equal contributions to the final tonality of the print for each ink level and that some input tint values should be reproduced using 100% coverage of a single ink level, which, as described above, may result in reduced quality.

Figure 2:
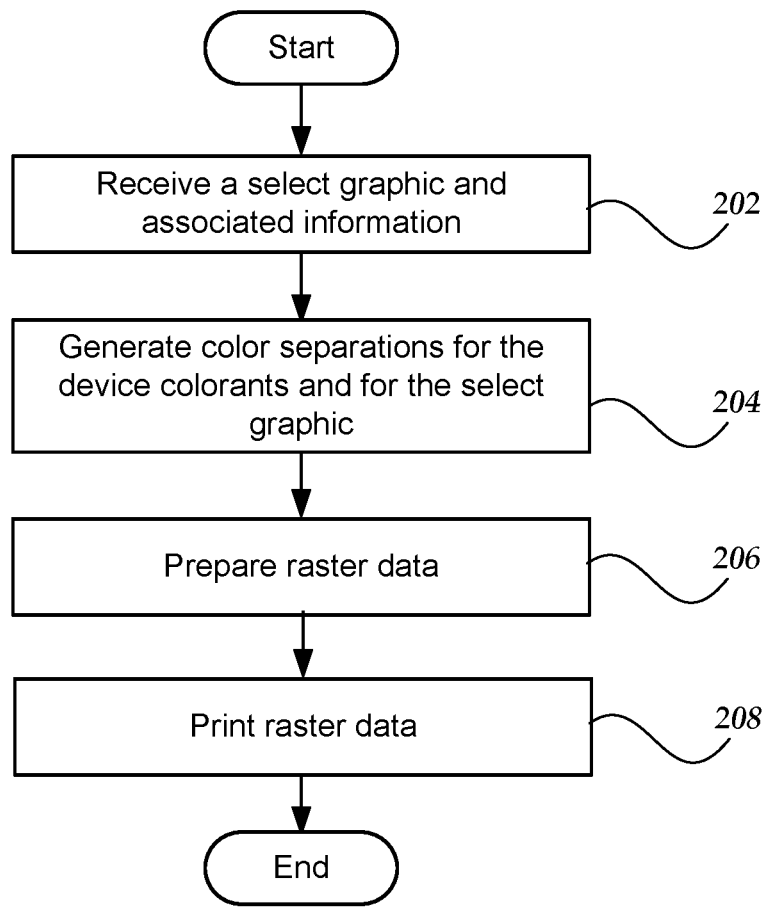
FIG. 2 is a schematic flowchart of one embodiment of a method of processing a document, according to the invention.

In contrast, the methods and systems described herein can be used for printing a security mark or other select graphic as part of a printed item, such as a document or any other printed material. FIG. 2 is a flowchart of a method for preparing and printing a select graphic, such as a security mark or any other suitable mark or graphical element, using a digital printing device.

In step 202, a select graphic, and associated information, is received or generated by a processing or printing device, such as a raster image processor (RIP) or a digital printing device. The select graphic can be security mark, guilloché, microtext, watermark, company or product logo, signature, or any other suitable graphic. It will be understood that, at least in some embodiments, multiple select graphics (and associated information) can be received or generated.

The associated information can include, but is not limited to, at least one position for printing the select graphic, a select spot color name, an optional tessellation pattern, a screen (e.g., a halftone screen), or the like. In at least some embodiments, the select spot color name and screen are selected or provided by a user or may be generated or selected by the system or processing or printing device. In at least some embodiments, the select spot color name is a name of a color (which may be device colorant or an actual spot colorant) that is to be used to print the select graphic. In at least some embodiments, the select spot color name can be any name including a name that is not a color, however, information associated with the select spot color name will indicate which colorant(s) to use to print the select graphic. In at least some embodiments, the select graphic is set to 100% tint because the tint used here is relative to the appearance of the solid of the respective colorant for the select graphic. For embodiments, with multiple select graphics, the associated information can be the same for all select graphics or can be different (or partially different) for some or all of the select graphics. In at least some embodiments, the select spot color name(s) is/are configured in the printing workflow.

In step 204, color separations are generated for the device colorants and spot color generation(s) is/are generated for the select graphic(s). The select spot color name associated with the select graphic indicates or identifies to the processing or printing device to generate a select spot color separation for the select graphic using the screen associated with the select graphic and select spot color name. In at least some embodiments, when the print job is raster image processed (RIPed) to generate a raster in for the press or printing device, a separate spot color channel for each select spot color separation is created, alongside those for the device colorant channels (for example, CMYK and possibly other colorants to extend the gamut or for special purposes, such as, for example, white, actual spot color(s), varnish, or the like.)

In at least some embodiments, no calibration is applied for these additional select spot color channels or an identify calibration is applied, which does not affect the tone level, or a calibration is applied that ensures that anything marked with the select spot color separation(s) is at 100% tint.

In at least some embodiments, the device colorant channels corresponding to the printing device colorants (or colorants other than the select spot colorants with the pre-specified select spot color names for screening) will be screened using the normal screening algorithm(s). The spot color channels corresponding to the select spot color separations with the pre-specified select spot color names are screened with the screen mapped to, or associated with, that select spot color name.

In step 206, raster data is prepared for printing and incorporates the select spot color separation(s) for the select graphic(s). In at least some embodiments, after all calibration and screening has been applied, the screened spot color separations for the select graphics are merged with the device colorant (and other colorant, if any) separations. As an example, a screened select spot color separation (with a pre-specified select spot color name intended for printing using magenta ink) is merged with the normal magenta color separation. The merged separations, as raster data, are sent to the printing device for printing.

In step 208, the raster data is printed as a document or other printed item. The select graphic(s) is/are printed on the document or other printed item. Examples of the printing of select graphics are described below.

For simplicity, the examples presented herein assume that each select graphic will be printed using only one device colorant (for example, one of cyan, magenta, yellow, black, or a spot colorant or the like.) The methods and systems are not limited to using a single device colorant for a select graphic. It will be understood that select spot color separations (one or more of which can be screened as described above) for multiple device colorants can be produced for a select graphic and that the select spot color name can point to multiple device colorants. In at least some embodiments, to achieve a different color, dot patterns can be combined using two or more device colorants (for example, the lightest cyan tone with no discernable screening (see example 1 below) and the darkest magenta tone to give a purple color.) Such combinations may depend on the printing device, ink, substrate, resolution, or the like or any combination thereof.

In at least some embodiments, using spot colors separations with designated special screening for one or more select graphics can result in a print job that can be created in a variety of professional design software that allow objects to be set to a custom select spot color separation. In at least some embodiments, the use of select spot color separations allows approval of the design and the locations for the special screening for one or more select graphics to be performed using a variety of off-the-shelf tools. In at least some embodiments, printing the select graphic(s) (e.g., security marks or any other suitable graphic) using a select spot color separation is constrained to printing devices that contain the special codes (e.g., the screen(s) and select spot color name(s)) to support the printing of the select graphic(s) with the correct information to map the select spot color names to each special screen for each select graphic. In at least some embodiments, the manipulation or presentation of pixels within a halftone screen to achieve the desired result may not be noticed by a would-be forger or other observer or individual but may be noticeable to one searching for the specially screened select graphic(s).

Example 1

In this example, the special screening is designed to provide a smooth and uniform tone value so that viewing the printed output, even under magnification, does not show a discernable screen. On many printing devices that can print multiple ink levels there are one or more screen patterns that appear smooth to the viewer, even when magnified, because the placement of ink drops yields a uniform thickness of ink coverage, or a uniform amount of colorant retained in the upper layers of the substrate.

As an example, for a printing device is capable of three different ink levels, using an ink technology, and printing on a substrate on which the ink remains on the surface and spreads slightly, then 100% coverage of the lowest ink level may leave small white holes where ink drops do not quite merge on the substrate surface, 100% coverage of the medium ink level may be sufficient to ensure that all ink drops merge on the substrate surface and the screening is not discernable, and 100% coverage of the highest ink level may lay down too much ink on the substrate, leading to, for example, poor drying or curing or to show-through (where the ink from one side of the substrate can be seen on the other) or to adhesion of one sheet or layer in the output roll to the next or the like or any combination thereof. In such an arrangement, 100% coverage of the medium ink level could be used for a special screen design.

Other combinations of ink drops with repeating patterns over a small distance may also be appropriate (for example, a checkerboard of the smallest and medium ink levels.) The appropriate pattern may depend on one or more factors, such as, for example, the printing device, ink technology, substrate, printing resolution, drier or curer power level, printing speed, or the like or any combination thereof.

As an example, a select spot color separation named "flat light cyan" is used to select the lightest tone using the cyan ink on the printing device than can be achieved without a discernable screening pattern. "Flat dark magenta" is used to select the darkest tone achievable with the magenta ink.

As indicated above, conventional screen designs that apply uniform coverage of 100% of the same ink level are typically avoided so that there is no tone level that can be requested in a normal print job, using normal screening for that press, that would result in a uniform grid of 100% coverage of a particular ink level (with the possible exception of the highest ink level, but that is rarely used because of the risk of over-inking). Moreover, complications regarding calibration, non-linear tonal responses, and the variability of tonal response, increase the difficulty of achieving a particular dot pattern in the output by simply requesting a specific tint value in the print job. Both of these issues result in the special screening pattern using 100% coverage of a particular ink level more suitable for security marking because the result can be reliably achieved by using a system that is specifically designed to do so.

Once printed, the authenticity of the printed item (for example, a printed label or carton) can be tested by looking for non-uniformity in those areas of the print in which a tint with no discernable screening pattern should be present. If a screen can be seen visually, or detected by automated tests for non-uniformity above a pre-specified threshold (for example, based on scanning or photographing the print), then the printed item will fail the test.

Example 2

Fine patterns of lines, known as guillochés or machine engraving, are often used in designs for security printing because these fine patterns are difficult to reproduce exactly, and therefore make forgeries more detectable. Intaglio printing presses are commonly used for bank notes and other long-run security prints. Such printing presses can achieve continuous fine lines in virtually any tone level of an ink.

The same is not generally true for offset, flexographic, or digital printing devices. Continuous fine lines at 100% coverage of an ink are achievable, but fine lines of lighter tints are rarely continuous when viewed under magnification because the screening algorithm applied means that different pixels in the line are painted at different ink levels. As discussed above, it's rarely possible for a print job to request that all pixels in a line are marked with the same ink level.

In contrast to the conventional methods and systems, the systems and methods discloses herein can employ two approaches to draw continuous fine lines in intermediate tone levels. First, a line is drawn as a line of the appropriate width and following the desired path. The line is marked as using a select spot color separation with a specific name that is treated as requesting a specially constructed screen design that corresponds to the screens described in Example 1 above. In at least some embodiments, this approach limits the tone levels of each colorant that may be used for such lines, but delivers flexibility in using different shapes of lines.

In a second approach, a larger area of the print job is marked as being a 100% fill of a select spot color separation with a specific name that is treated as selecting a special screen. In this approach, the special screen paints a rectangular (or other) area with a tile of a guilloche pattern, which is tessellated across the area to be filled. In at least some embodiments, the tile is designed with patterns of ink levels that cannot be reproduced using the standard screens that are applied to all graphics that are not configured to select a special screen. As an example, a line of pixels within the tile (which does not need to be a straight line) are marked for painting with the same ink level, while another area adjacent is marked for painting with a different ink level.

In at least some embodiments, both of these approaches achieve an effect that appears overt but is also covert. The presence of a guilloche is commonly expected as part of anti-counterfeit measures, but the fact that the lines are continuous and uniform, but not at the same density as would arise from requesting 100% of that ink, and that it is difficult to achieve such a result on a digital printing device is less obvious to most people. In at least some embodiment, it may be obvious, or at least definitively detectable, to an expert examining a printed piece whether it was printed with an intaglio process or using a digital press.

Example 3

This third example builds further on the second approach used to mark guilloche-like patterns described above in Example 2. In at least some embodiments, the tile of the special screen can represent any desired graphic with an expectation that the design includes structures that can only be achieved by applying special screening. In particular, the tile can include areas within the design that are painted with the same kind of screening design that would be used to produce an undiscernible screen, as described above in Example 1. For example, the design can represent a company or product logo, a signature, or anything else. That design is tessellated across the output to cover the area of any graphic that is marked with the name of a select spot color separation to request that design. The presence of a repeating design will be visible to users, but also include a covert security marking because the uniformity of tone levels in some areas of that repeating design could not normally be achieved on a digital press.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method for preparing a select graphic for printing using a digital printing device, the method comprising:
receiving the select graphic, at least one position for printing the select graphic, and a select spot color name for the select graphic, wherein the select spot color name represents a tone printable using at least one colorant of the digital printing device;
generating a select spot color separation for the select graphic using a halftone screen to produce the tone represented by the select spot color name, wherein the halftone screen is selected for printing the select graphic without a discernible dot pattern upon unmagnified viewing; and
preparing raster data incorporating the select spot color separation for printing the select graphic at the at least one position on an item.

2. The method of claim 1, wherein the select graphic is a security marking.

3. The method of claim 1, wherein the select graphic is a guilloche pattern.

4. The method of claim 1, wherein the select graphic is configured for tessellation over a region of the item.

5. The method of claim 1, wherein the tone represented by the select spot color name is generated by the halftone screen using 100% coverage of a single ink level.

6. The method of claim 5, wherein the single ink level used by the halftone screen is not a lowest ink level of the digital printing device or a highest ink level of the digital printing device.

7. The method of claim 1, wherein the tone represented by the select spot color name is generated by the halftone screen using only a single ink level, wherein the single ink level is not a lowest ink level of the digital printing device or a highest ink level of the digital printing device.

8. The method of claim 1, further comprising printing the raster data.

9. The method of claim 1, wherein preparing the raster data comprises merging the select spot color separation with a color separation for a one of the at least one colorant used by the tone represented by the select spot color name.

10. A system for processing a document for printing, the system comprising:
- at least one processor configured and arranged to perform actions, comprising
  - receiving the select graphic, at least one position for printing the select graphic, and a select spot color name for the select graphic, wherein the select spot color name represents a tone printable using at least one colorant of the digital printing device;
  - generating a select spot color separation for the select graphic using a halftone screen to produce the tone represented by the select spot color, wherein the halftone screen is selected for printing the select graphic without a discernible dot pattern upon unmagnified viewing; and
  - preparing raster data incorporating the select spot color separation for printing the select graphic at the at least one position on an item.

11. The system of claim 10, wherein the select graphic is a security marking, a guilloche pattern, or is configured for tessellation over a region of a printed item.

12. The system of claim 10, wherein the tone represented by the select spot color name is generated by the halftone screen using 100% coverage of a single ink level.

13. The system of claim 12, wherein the single ink level used by the halftone screen is not a lowest ink level of the digital printing device or a highest ink level of the digital printing device.

14. The system of claim 10, wherein the tone represented by the select spot color name is generated by the halftone screen using only a single ink level, wherein the single ink level is not a lowest ink level of the digital printing device or a highest ink level of the digital printing device.

15. The system of claim 10, further comprising printing the raster data.

16. The system of claim 10, wherein preparing the raster data comprises merging the select spot color separation with a color separation for a one of the at least one colorant used by the tone represented by the select spot color name.

17. A non-transitory computer-readable medium having processor-executable instructions for processing documents, the processor-executable instructions when installed onto a device enable the device to perform actions, comprising
- receiving a select graphic, at least one position for printing the select graphic, and a select spot color name for the select graphic, wherein the select spot color name represents a tone printable using at least one colorant of a digital printing device;
- generating a select spot color separation for the select graphic using a halftone screen to produce the tone represented by the select spot color name, wherein the halftone screen is selected for printing the select graphic without a discernible dot pattern upon unmagnified viewing; and
- preparing raster data incorporating the select spot color separation for printing the select graphic at the at least one position on an item.

18. The non-transitory computer-readable medium of claim 17, wherein the select graphic is a security marking, a guilloche pattern, or is configured for tessellation over a region of a printed item.

19. The non-transitory computer-readable medium of claim 17, wherein the tone represented by the select spot color name is generated by the halftone screen using 100% coverage of a single ink level.

20. The non-transitory computer-readable medium of claim 17, wherein the tone represented by the select spot color name is generated by the halftone screen using only a single ink level, wherein the single ink level is not a lowest ink level of the digital printing device or a highest ink level of the digital printing device.

* * * * *